US012458878B2

(12) United States Patent
Cai et al.

(10) Patent No.: US 12,458,878 B2
(45) Date of Patent: Nov. 4, 2025

(54) METHOD AND APPARATUS FOR CONTROLLING AR GAME, ELECTRONIC DEVICE AND STORAGE MEDIUM

(71) Applicant: Beijing Bytedance Network Technology Co., Ltd., Beijing (CN)

(72) Inventors: Wenqiang Cai, Beijing (CN); Lingjiang Wu, Beijing (CN); Guanyu Chen, Beijing (CN); Bo Lin, Beijing (CN); Zhehao Li, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 302 days.

(21) Appl. No.: 18/043,617

(22) PCT Filed: Aug. 10, 2021

(86) PCT No.: PCT/CN2021/111872

§ 371 (c)(1),
(2) Date: Mar. 1, 2023

(87) PCT Pub. No.: WO2022/088840

PCT Pub. Date: May 5, 2022

(65) Prior Publication Data

US 2023/0271083 A1 Aug. 31, 2023

(30) Foreign Application Priority Data

Oct. 29, 2020 (CN) ........................ 202011182612.9

(51) Int. Cl.
*A63F 13/215* (2014.01)
*A63F 13/213* (2014.01)
(Continued)

(52) U.S. Cl.
CPC .......... *A63F 13/424* (2014.09); *A63F 13/213* (2014.09); *A63F 13/533* (2014.09);
(Continued)

(58) Field of Classification Search
CPC .... A63F 13/211; A63F 13/213; A63F 13/424; A63F 13/533
See application file for complete search history.

(56) References Cited

U.S. PATENT DOCUMENTS

2018/0108349 A1 4/2018 Hutchings
2020/0101383 A1* 4/2020 Hwang ................ A63F 13/215
(Continued)

FOREIGN PATENT DOCUMENTS

CN 106681683 A 5/2017
CN 107274891 A 10/2017
(Continued)

OTHER PUBLICATIONS

ISA China National Intellectual Property Administration, International Search Report and Written Opinion Issued in Application No. PCT/CN2021/111872, Sep. 28, 2021, WIPO, 12 pages.
(Continued)

*Primary Examiner* — Lawrence S Galka
(74) *Attorney, Agent, or Firm* — Alleman Hall & Tuttle LLP

(57) ABSTRACT

Provided are a method and apparatus for controlling an AR game, an electronic device and a storage medium. In the provided method for controlling an AR game, a game control instruction is determined, according to a voice instruction obtained during running of the AR game and a preset instruction mapping relationship, and then the AR game is controlled according to the game control instruction.

20 Claims, 7 Drawing Sheets

(51) Int. Cl.

| | |
|---|---|
| ***A63F 13/424*** | (2014.01) |
| ***A63F 13/533*** | (2014.01) |
| ***A63F 13/63*** | (2014.01) |
| ***A63F 13/65*** | (2014.01) |
| ***A63F 13/837*** | (2014.01) |

(52) U.S. Cl.

CPC ............ *A63F 13/65* (2014.09); *A63F 13/837* (2014.09); *A63F 2300/8082* (2013.01)

(56) References Cited

U.S. PATENT DOCUMENTS

| | | | | |
|---|---|---|---|---|
| 2020/0384362 | A1* | 12/2020 | Shah | A63F 13/424 |
| 2021/0275905 | A1* | 9/2021 | Doucet | A63F 13/54 |

FOREIGN PATENT DOCUMENTS

| | | | |
|---|---|---|---|
| CN | 107608649 | A | 1/2018 |
| CN | 107773982 | A | 3/2018 |
| CN | 108465238 | A | 8/2018 |
| CN | 108479075 | A | 9/2018 |
| CN | 109589603 | A | 4/2019 |
| CN | 109847348 | A | 6/2019 |
| CN | 110327622 | A | 10/2019 |
| CN | 111228791 | A | 6/2020 |
| CN | 111530079 | A | 8/2020 |
| CN | 112295220 | A | 2/2021 |

OTHER PUBLICATIONS

China National Intellectual Property Administration, Office Action and Search Report Issued in Application No. 202011182612.9, Feb. 26, 2024, 12 pages. (Submitted with partial English translation).

* cited by examiner

METHOD AND APPARATUS FOR CONTROLLING AR GAME, ELECTRONIC DEVICE AND STORAGE MEDIUM

CROSS-REFERENCE TO RELATED APPLICATIONS

This application is a national stage of the International application PCT/CN2021/111872, filed on Aug. 10, 2021. This International application claims priority to Chinese Patent Application No. 202011182612.9, filed on Oct. 29, 2020, and the contents of these applications are hereby incorporated by reference in their entireties.

TECHNICAL FIELD

The present disclosure relates to the technical field of games, and in particular, to a method and apparatus for controlling an AR game, an electronic device and a storage medium.

BACKGROUND

With the development of game technology, many types of games (for example, shooting games, racing games, and battle games) begin to incorporate augmented reality (AR) technology to realize game interaction.

At present, the control over AR games is usually triggered by a hardware device, such as a keyboard, mouse, handle and touch screen. Particularly, when an AR game is played on a mobile phone, the AR game is usually controlled by triggering trigger controls on a display interface of a touch screen of the mobile phone.

However, the AR game needs a large area to display a real interface or a virtual interface. The way of controlling the game through the trigger controls laid out in the display interface would make the display area of the screen to be occupied, which affects the display effect of the AR game. Moreover, the user needs to memorize locations and menus of these trigger controls, which would also affect the user's interactive experience.

SUMMARY

The present disclosure provides a method and apparatus for controlling an AR game, an electronic device and a storage medium, to solve the technical problem that the display effect and user experience of AR games are affected due to occupation of the display area of the screen by trigger controls when the game is controlled through such trigger controls.

In a first aspect, embodiments of the present disclosure provide a method for controlling an AR game, and the method includes:

acquiring a voice instruction during running of the AR game;

determining a game control instruction, according to the voice instruction and a preset instruction mapping relationship; and controlling a virtual object in the AR game according to the game control instruction, where the virtual object is a game element that is superimposed and displayed on an image of a real environment.

In a second aspect, the embodiments of the present disclosure provide an apparatus for controlling an AR game, and the apparatus includes:

an acquiring module, configured to acquire a voice instruction during running of the AR game;

a processing module, configured to determine a game control instruction, according to the voice instruction and a preset instruction mapping relationship; and a controlling module, configured to control a virtual object in the AR game according to the game control instruction, where the virtual object is a game element that is superimposed and displayed on an image of a real environment.

In a third aspect, the embodiments of the present disclosure provide an electronic device, and the electronic device includes:

a processor;

a memory, configured to store a computer program for the processor; and a display, configured to display an AR game interface processed by the processor;

where the processor is configured to implement, by executing the computer program, the method for controlling an AR game as described in the first aspect and various possible designs of the first aspect.

In a fourth aspect, the embodiments of the present disclosure provide a computer-readable storage medium storing computer-executable instructions thereon. When a processor executes the computer-executable instructions, the method for controlling an AR game described in the first aspect and various possible designs of the first aspect above is implemented.

In a fifth aspect, the embodiments of the present disclosure provide a computer program product, including a computer program carried on a non-transitory computer-readable medium. The computer program, when being executed by a processor, causes the method for controlling an AR game described in the first aspect and various possible designs of the first aspect above to be implemented.

In a sixth aspect, the embodiments of the present disclosure provide a computer program. The computer program, when being executed by a processor, causes the method for controlling an AR game described in the first aspect and various possible designs of the first aspect above to be implemented.

In the method and apparatus for controlling an AR game, the electronic device and the storage medium provided by the embodiments of the present disclosure, a game control instruction is determined, according to a voice instruction acquired during running of the AR game and a preset instruction mapping relationship; and then a virtual object in the AR game is controlled according to the game control instruction. It can be seen that, during the running of the AR game, the game operation instruction can be rapidly input though voice technology, and a virtual object in the game can be operated and controlled without triggering a game control. Therefore, the user does not need to memorize a placement location of a specific interactive control corresponding to the virtual object. For an instant AR game, the operation efficiency can be greatly improved. Furthermore, there is no need to display a specific interactive control on a main screen, and more game contents can be displayed in a limited display space of the screen.

BRIEF DESCRIPTION OF DRAWINGS

In order to explain technical solutions of the embodiments of the present disclosure or the prior art more clearly, drawings that need to be used in the description of the embodiments or the prior art will briefly introduced in the following. Obviously, the drawings in the following description are some embodiments of the present disclosure; and for those of ordinary skill in the art, other drawings can be obtained according to these drawings without any creative effort.

DESCRIPTION OF EMBODIMENTS

Figure 1:
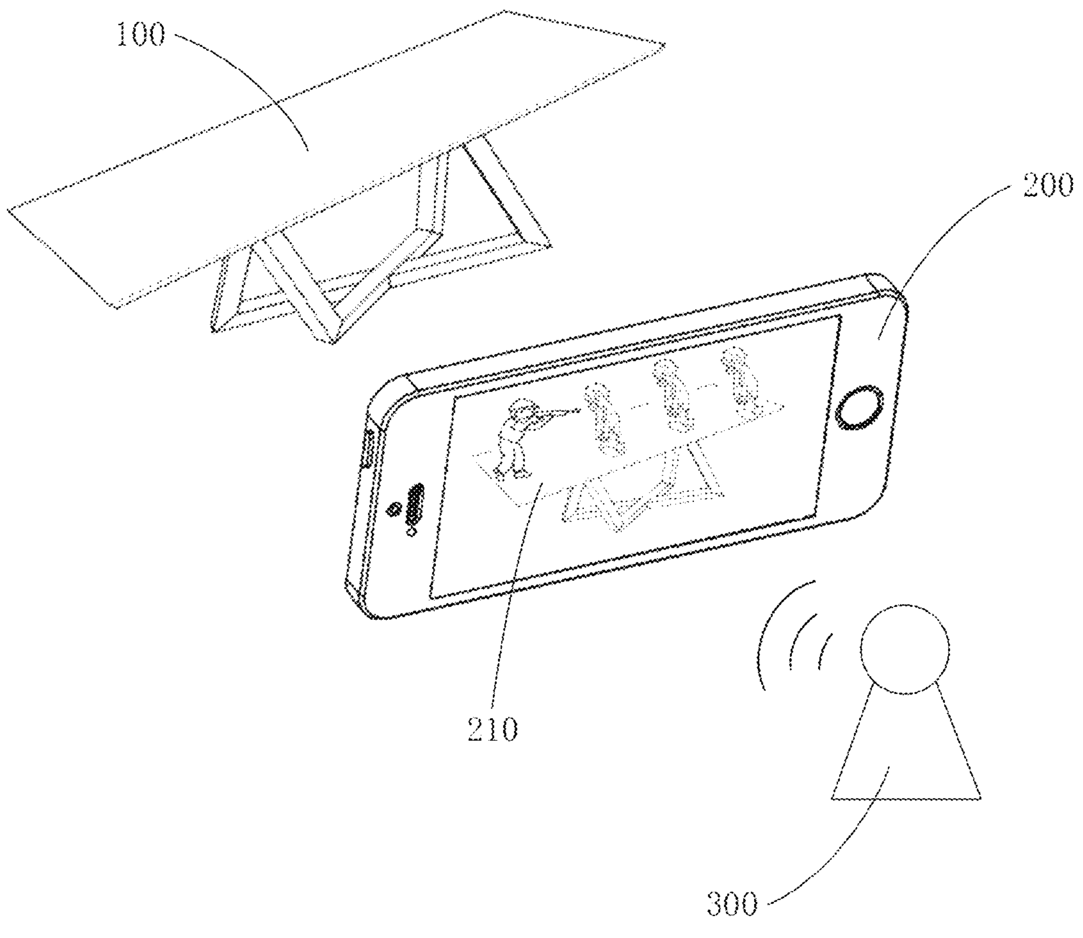
FIG. 1 is a diagram illustrating an application scenario of a method for controlling an AR game according to an exemplary embodiment of the present disclosure.

The embodiments of the present disclosure will be described in more detail below with reference to the drawings. Although some embodiments of the present disclosure are shown in the drawings, it should be understood that the present disclosure may be implemented in various forms and should not be construed as being limited to the embodiments set forth here. On the contrary, these embodiments are provided for more thorough and comprehensive understanding of the present disclosure. It should be understood that the drawings and embodiments of the present disclosure are only for illustrative purposes, and are not intended to limit the protection scope of the present disclosure.

It should be understood that steps described in the method embodiments of the present disclosure may be performed in a different order and/or in parallel. In addition, the method embodiments may include additional steps and/or omit a step shown. The scope of the present disclosure is not limited in this respect.

As used herein, the term "include" and its variations are intended for an open inclusion, that is, "including but not limited to". The term "based on" means "based at least in part on". The term "one embodiment" means "at least one embodiment"; the term "another embodiment" means "at least one other embodiment"; and the term "some embodiments" means "at least some embodiments". Relevant definitions of other terms will be given in the following description.

It should be noted that the modifiers of "one" and "a plurality of" mentioned in the present disclosure are illustrative rather than restrictive, and those skilled in the art should understand that they should be understood as "one or more", unless explicitly indicated in the context otherwise.

AR is a technology in which information of the real world is acquired through a camera and it is calculated, so as to link the virtual world to the real world, thereby enabling the user to interact with the real world through the virtual world. Most of AR games are played in a way that, an image of the real world is acquired by a camera of a terminal device, and after being fused with game elements in a virtual game, it is displayed on the screen of the terminal device for interaction. It is illustrated by taking an AR shooting game as an example, where the AR shooting game is a kind of AR game having high requirements for real-time performance, which is a game that uses the AR technology to generate obstacles or enemies in the virtual world according to some position information in the real world, and allows the users to shoot.

For the AR shooting game, it is usually necessary to provide a large area for displaying the real or virtual world. However, the size of screens of mainstream terminal devices available in the market is usually limited. For example, for the screen having a size of about 6 inches of a mobile phone, the area available for interactive operations is relatively limited. With the increasing demands of users, in order to pursue higher interest, the gameplay of the AR shooting games would become more diverse. Accordingly, more and more interactive operations need to be performed, which will become more and more complicated.

At present, the mainstream solution is to place commonly used interactive controls on the main screen, and place the other infrequently-used interactive controls in a secondary menu. However, on one hand, the immediacy of interactive operations is greatly reduced, which would reduce the user experience for the AR shooting game that has high requirements for immediacy; and on the other hand, it also requires the user to memorize a specific placement position of a specific interactive control, which increases the operation difficulty of the user.

In order to solve the above problems, the present disclosure aims to provide a solution for controlling an AR game, by which an input game operation instruction can be rapidly executed through voice recognition technology, and the game can be operated and controlled without triggering a game control. Therefore, the user does not need to memorize a placement location of a specific interactive control. For an instant AR game, the operation efficiency can be greatly improved. Furthermore, there is no need to display a specific interactive control on the main screen, and more game contents can be displayed in a limited display space of the screen.

FIG. 1 is a diagram illustrating an application scenario of a method for controlling an AR game according to an exemplary embodiment of the present disclosure. As shown in FIG. 1, the method for controlling an AR game provided in the embodiment may be performed by a terminal device having a camera and a display screen. Specifically, an image of the real environment captured by the camera on the terminal device is input into a processor, and the processor generates virtual objects according to game settings; then, the image of the real environment image is synthesized with the virtual objects though a graphics processing system, and is output to a display of the terminal device. The user may see a final enhanced scene image from the display, which image integrates information of the real environment and the virtual objects. Moreover, in the game control of the AR game, the control over the virtual object, i.e., a corresponding virtual game element, in the enhanced scene image usually requires high real-time interactivity. For example, the control over a virtual game prop or a virtual game character in the AR game usually requires high real-time performance. A smart phone may be used as a terminal device for an exemplary explanation. Specifically, a desktop 100 may be captured through a camera on a mobile phone 200 and displayed, and then fused with game elements in the virtual game; accordingly, a fused game interface 210 is displayed on the screen of the mobile phone 200. When a user 300 controls the game, voice instructions may be input by way of voice input, and the virtual object in the AR game is controlled through voice control.

The present disclosure aims to provide a way of controlling a virtual object in any AR game through a voice instruction, without any specific limitation on the specific types of the AR games or on the game scenes on which the AR games are based. The specific types of AR games involved in the following embodiments are only for the convenience of understanding the implementations of the related technical solutions, and for other types of AR games that are not specifically described, there is no doubt that the virtual objects thereof can also be controlled according to the specific description in the present disclosure.

In one scenario, it is illustrated by taking a case where the AR game is an AR shooting game as an example. The AR game may be an AR shooting game. The user may switch to a corresponding weapon by inputting a weapon name through voice. For example, by inputting "rifle" through voice, the weapon of a target object in the game is witched to "rifle". The corresponding weapon may also be triggered to attack, by inputting an onomatopoeic word. For example, by inputting "bang bang bang" though voice, the "rifle" is triggered to shoot.

In addition, the AR game may also be an AR tower defense game. The user may switch to a corresponding weapon by inputting a weapon name through voice. For example, by inputting "fort" through voice, the attack weapon in the game may be switched to "fort". The corresponding weapon may also be triggered to attack, by inputting an onomatopoeic word. For example, by inputting "boom boom boom" through voice, the "fort" is triggered to shell.

It is worth explaining that, in the embodiment, the target object controlled through voice in the above-mentioned AR game is a virtual object in the AR game, that is, a virtual game element superimposed and displayed on the image of the real environment, which may be a virtual game character or a virtual game prop. In addition, the above-mentioned exemplary types of AR games are only to illustrate the control effect of the embodiment, but not to limit the specific types of AR games involved in the present disclosure. The voice control instructions for different types of AR games may be configured adaptively according to the specific characteristics of the games.

However, for the above-mentioned scenes, in the prior art, the way of triggering through a specific interactive control requires complex clicks on the main screen. For example, when a target object is equipped with a plurality of props (e.g., weapons), the user usually cannot directly switch the current weapon to a desired target weapon. Rather, the user needs to enter a prop setting interface (e.g., an arsenal interface) first, and then selects a weapon. Alternatively, the current weapon may be switched to the target weapon only after switching is performed through a weapon switching control, where the switching process is related to the order of the arranged weapons. If a weapon ranked immediately behind the current weapon is not the target weapon, the switching operation would need to be triggered for many times to achieve the purpose of weapon switching. In addition, for controlling a weapon to attack, at present, it is necessary to constantly trigger a shooting control to realize the attack, where frequent click operations are easy to reduce the user's game experience.

In addition, because there may be some game play of dodging enemy attacks and finding a suitable shooting angle in the AR shooting game, the user needs to hold the mobile phone for a long time to move or sheer off. Therefore, the holding mode of the mobile phone is also very important for the game experience of the AR shooting game.

Figure 2:
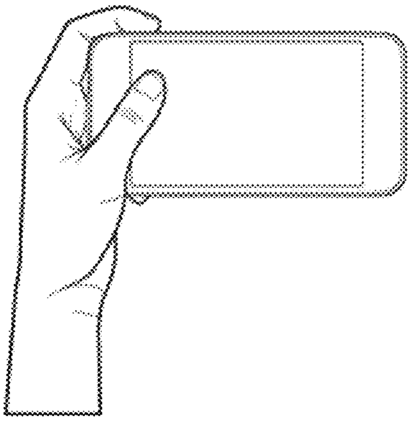
FIG. 2 (Prior art)
FIG. 2 is a schematic diagram illustrating a hand holding posture of an electronic device in an AR game in the prior art.

FIG. 2 is a schematic diagram illustrating a hand holding posture of an electronic device in an AR game in the prior art. As shown in FIG. 2, in the prior art, the way of controlling the game by triggering a specific interactive control requires that, the thumb of the user may be enabled to trigger the touch screen when the user holds the mobile phone. Specifically, for the way of controlling the game by triggering a specific interactive control, the corresponding posture of holding the mobile phone is usually that: the forefinger and palm clamp the mobile phone to fix it in position, the middle finger bears the main weight of the mobile phone, and the thumb is used for interactive operations. This is feasible when the position and orientation of the mobile phone are stationary. However, when the position and orientation of the mobile phone change frequently, the mobile phone would easily slide down because the palm is not suitable for serving as a supporting point.

Figure 3:
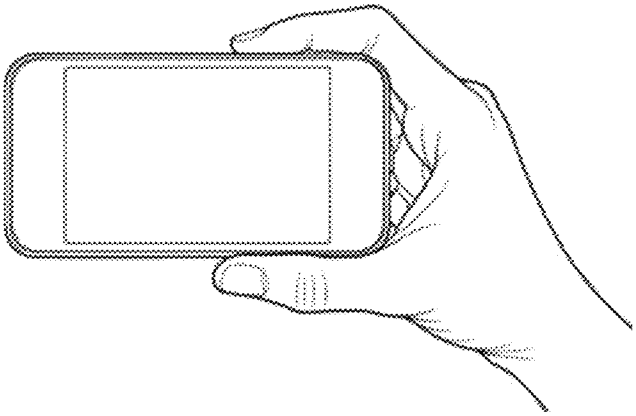
FIG. 3 is a schematic diagram illustrating a hand holding posture of an electronic device in an AR game in the present disclosure.

FIG. 3 is a schematic diagram illustrating a hand holding posture of an electronic device in an AR game in the present disclosure. As shown in FIG. 3, for the above-mentioned problem that the mobile phone would easily slide down in the AR shooting game, it can be solved by changing the posture of holding the mobile phone. In the way of controlling the game based on triggering voice instructions, the user does not need to trigger the touch screen with the thumb, and the thumb may thus be used as a supporting point. Specifically, the new posture may use the thumb, instead of the palm, as a supporting point, which makes the mobile phone better fixed. It can be seen that, by adding voice control as a new operation solution in the AR shooting game, the problem of unstable holding of the mobile phone caused when the user holds the mobile phone for a long time to move or sheer off can be solved.

Figure 4:
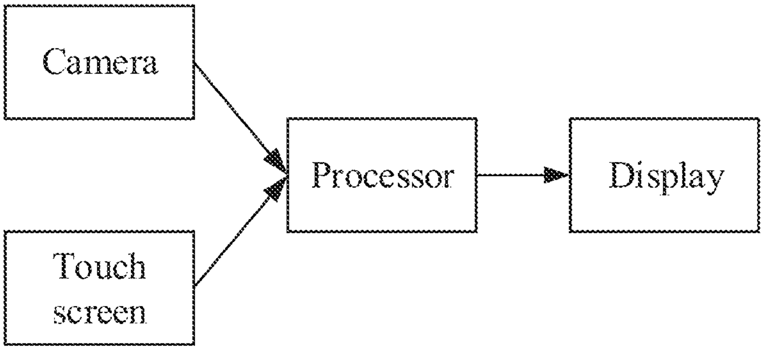
FIG. 4 (Prior art)
FIG. 4 is a schematic diagram illustrating an AR game processing logic in the prior art.

FIG. 4 is a schematic diagram illustrating an AR game processing logic in the prior art. As shown in FIG. 4, for the way of controlling the game by triggering a specific interactive control in the prior art, real objects and scenes may be captured through a camera on a mobile phone, and then fused with game elements in a virtual game; and after the fusion is performed by a processor in the mobile phone, a fused game interface is displayed on a display. When the user controls the game, the user may control operations of the AR game by triggering a touch screen to input touch instructions.

Figure 5:
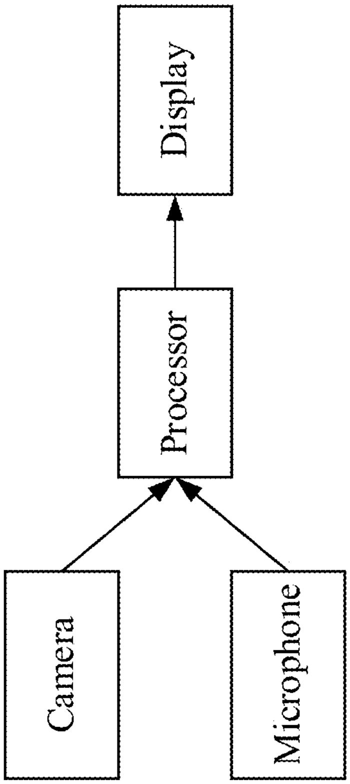
FIG. 5 is a schematic diagram illustrating an AR game processing logic in the present disclosure.

FIG. 5 is a schematic diagram illustrating an AR game processing logic in the present disclosure. As shown in FIG. 5, for the way of controlling the game through voice instructions in the technical solution disclosed in the present disclosure, real objects and scenes may be captured through a camera on a mobile phone, and then fused with game elements in a virtual game; and after the fusion is performed by a processor in the mobile phone, a fused game interface is displayed on a display. When the user controls the game, the user may control operations of the AR game by acquiring voice instructions input through a microphone.

Figure 6:
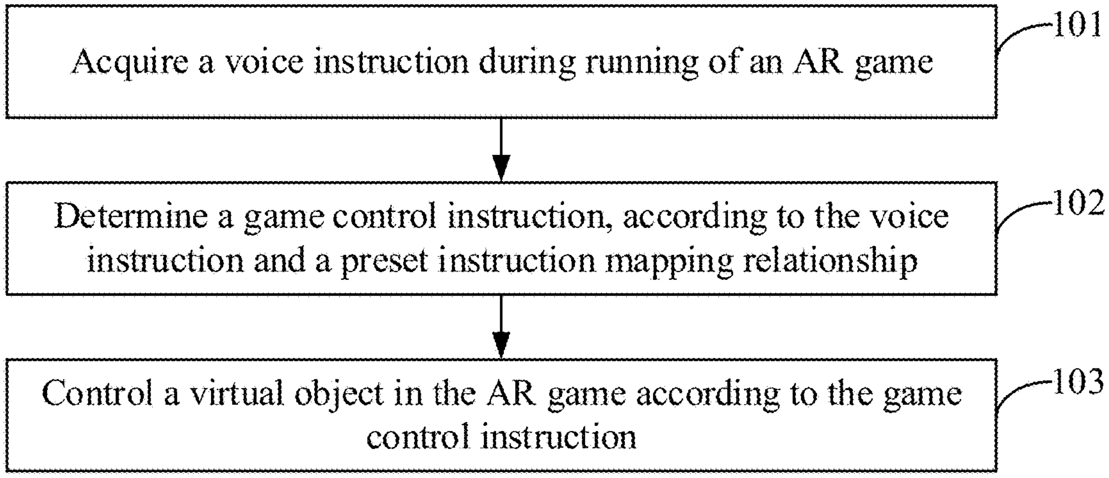
FIG. 6 is a schematic flowchart of a method for controlling an AR game according to an exemplary embodiment of the present disclosure.

FIG. 6 is a schematic flowchart of a method for controlling an AR game according to an exemplary embodiment of the present disclosure. As shown in FIG. 6, the method for controlling an AR game provided in the embodiment includes steps as follows.

At step 101, a voice instruction is acquired during running of an AR game.

When a user plays an AR game, real objects and scenes, such as a real desktop scene, may be captured through a camera on a terminal device. Then, game elements are fused on an image of the real desktop through a processor in the terminal device, and an AR game interface is displayed on a display screen of the terminal device. During the running of the AR game, the user may input corresponding voice instructions according to the control requirements for the game.

At step 102, a game control instruction is determined, according to the voice instruction and a preset instruction mapping relationship.

After the voice instruction is acquired, the game control instruction may be determined according to the voice instruction and the preset instruction mapping relationship. For example, based on a predefined keyword set, the voice instruction may be recognized through voice recognition technology; and when a valid keyword is obtained from the input, a game control instruction corresponding to the keyword may be obtained through an established mapping relationship between keywords and the game control instructions. As such, the obtained game control instruction may be used to control the AR game. In this way, the AR game can be quickly controlled by inputting the voice instruction.

At step 103, a virtual object in the AR game is controlled according to the game control instruction.

It's worth explaining that, the AR game synthesizes the image of the real environment with the virtual objects, and outputs the generated AR game interface to the display of the terminal device for display. The user may see the final enhanced AR game interface from the display. In the game interaction of the AR game, it is mainly to control the virtual objects in the interface, which usually requires high real-time interactivity. Specifically, the control over the virtual objects in the AR game may be control over virtual game props or virtual game characters. For example, it may control a game character in the AR shooting game, it may control an attack weapon in the AR tower defense game, it may control a racing vehicle in an AR racing game, or it may control a musical instrument in an AR music game. The types of games and the types of virtual objects are not limited in the present disclosure.

In the embodiment, the game control instruction is determined according to the voice instruction acquired during the running of the AR game and the preset instruction mapping relationship, and then the AR game is controlled according to the game control instruction. It can be seen that, during the running of the AR game, the game operation instruction can be rapidly input though voice technology, and the virtual object in the game can be operated and controlled without triggering a game control. Therefore, the user does not need to memorize a placement location of a specific interactive control corresponding to a game element. For an instant AR game, the operation efficiency can be greatly improved. Furthermore, there is no need to display a specific interactive control on a main screen, and more game contents can be displayed in a limited display space of the screen.

Figure 7:
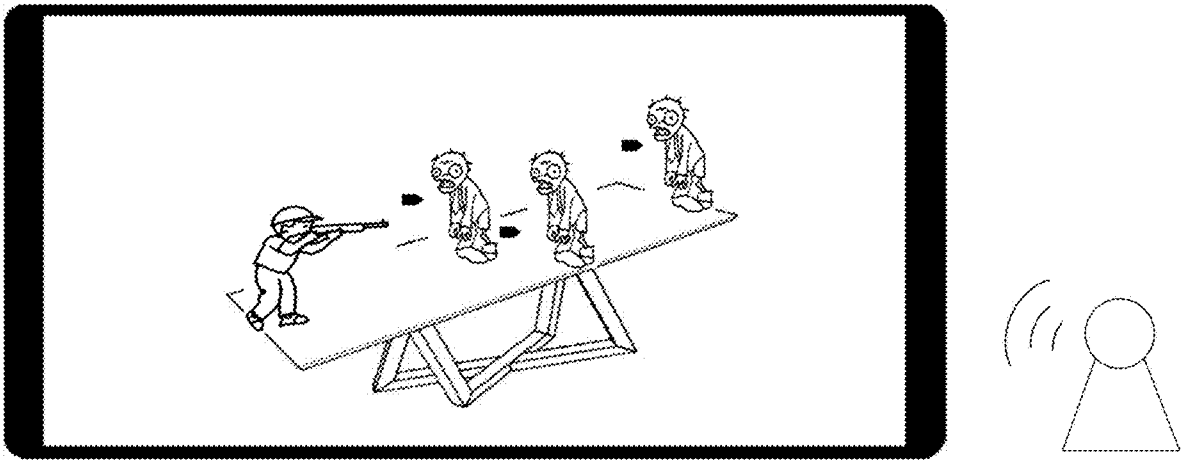
FIG. 7 is a schematic diagram illustrating an interface of the AR game in the embodiment shown in FIG. 6.

FIG. 7 is a schematic diagram illustrating an interface of the AR game in the embodiment shown in FIG. 6. As shown in FIG. 7, when the user is playing the AR shooting game, the real desktop may be captured through the camera on the mobile phone. Then, the virtual game elements, such as shooting characters, tower defense weapons, and shooting props, are fused on the image of the real desktop through the processor in the mobile phone, and the fused AR shooting game interface is displayed on the display screen of the mobile phone. In the combat interface of the AR game, the target object may be instructed to execute the target action by acquiring the voice instruction, for example, the shooting character may be instructed, through the voice instruction, to shoot.

FIG. 7 is a schematic diagram illustrating an interface of the AR game in the embodiment shown in FIG. 6. As shown in FIG. 7, it may be continuously illustrated by taking the AR shooting game as an example, to exemplarily explain the above-mentioned way of controlling the virtual object in the AR game by using the voice instruction. Specifically, when the user is playing the AR shooting game, the real desktop may be captured through the camera on the mobile phone. Then, the virtual game elements, such as shooting characters, tower defense weapons, and shooting props, are fused on the image of the real desktop through the processor in the mobile phone, and the fused AR shooting game interface is displayed on the display screen of the mobile phone. In the combat interface of the AR game, the target object may be instructed to execute the target action by acquiring the voice instruction, for example, the shooting character may be instructed, through the voice instruction, to shoot.

As for the above-mentioned voice instruction, it may not only be a noun or verb voice instruction corresponding to the game prop, but may also be an onomatopoeic word-type voice instruction corresponding to a target action to be performed by the game prop. When using the onomatopoeic word as the voice instruction to control the game prop, a frequency of voice input may be first determined according to the voice instruction including the onomatopoeic word, that is, a frequency at which the game prop executes the target action may be determined by determining an input speed of the onomatopoeic word. For example, taking the shooting game as an example, if the game prop (for example, an attack weapon) is controlled through an onomatopoeic word, the frequency of voice input may be determined according to the voice instruction including the onomatopoeic word, that is, an attack frequency of the attack weapon may be determined by determining the input speed of the onomatopoeic word. Referring to FIG. 7 continuously, it is still illustrated by taking the shooting game as an example, if the weapon held by the current shooting character is a sniper rifle or a rifle, the user may control the currently held weapon to shoot by inputting a corresponding voice instruction, for example, by inputting "shoot" through voice. The currently held weapon may also be controlled to shoot by inputting, through voice, an onomatopoeic word corresponding to attacking of the attack weapon, for example, by inputting "bang bang bang" through voice. Moreover, the shooting frequency of the weapon may be controlled according to the input frequency of the onomatopoeic word "bang bang bang" in the voice.

Figure 8:
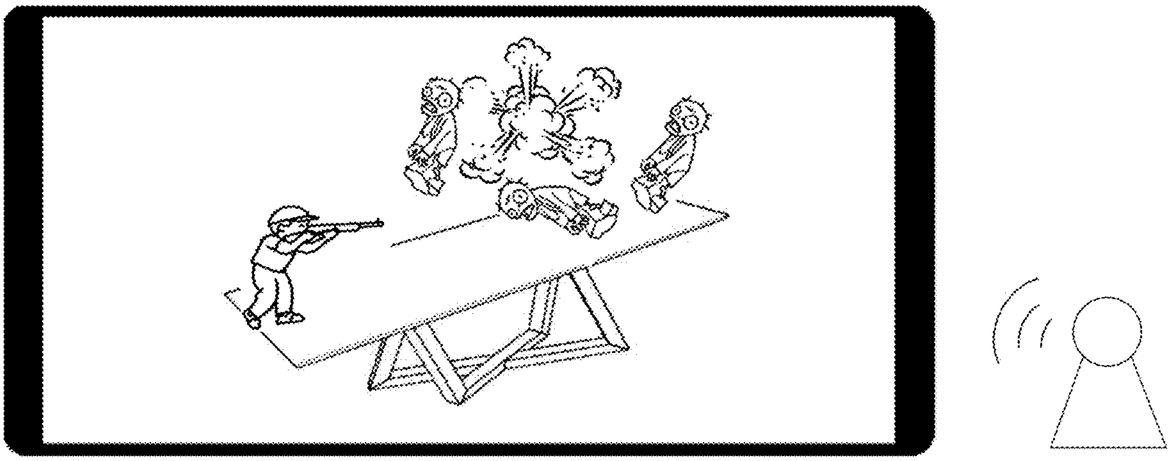
FIG. 8 is a schematic diagram illustrating another interface of the AR game in the embodiment shown in FIG. 6.

In the embodiment, in addition to controlling the game prop to execute the target action through the voice instruction, a new game prop in the game may also be awakened or triggered through the voice instruction. It is still illustrated by taking the shooting game as an example. During the game, through a voice instruction, a drone may be summoned to attack, or a character may be triggered to throw a grenade. FIG. 8 is a schematic diagram illustrating another interface of the AR game in the embodiment shown in FIG. 6. As shown in FIG. 8, a grenade may be triggered to attack by inputting "grenade" through voice, and the grenade may also be controlled to attack by inputting "boom boom boom" through voice.

In addition, in a case where the awakened or triggered game prop has an area of effect or an intensity attribute, a volume of voice input may be first determined according to the voice instruction, where the volume of voice input is used to represent a sound intensity of a target audio in the voice instruction. Then, the area of effect and/or intensity of the target action of the game prop may be determined according to the volume of voice input. It is still illustrated by taking the shooting game as an example, the volume of voice input may be first determined according to the voice instruction, where the volume of voice input is used to represent the sound intensity of the target audio in the voice instruction; and then, the attack intensity and/or attack range of the attack weapon may be determined according to the volume of voice input. It is still illustrated by taking the shooting game as an example, when the grenade is triggered to be thrown, the intensity and/or attack range of the attacking of the grenade may be determined according to the volume of the input voice "boom boom boom"; and when the drone is awakened to bomb the ground, the intensity and/or attack range of the ground bombing may also be determined according to the volume of the input voice "boom boom boom". It is worth noting that the above onomatopoeic word is only for illustrative purposes, and do not limit the specific forms of the voice.

In a possible implementation, besides controlling a corresponding attack weapon through voice, a related auxiliary prop may also be triggered by the voice instruction in the embodiment. For example, taking the shooting game as an example, a blood replenishing operation may be triggered by inputting "first-aid kit" through voice. In addition, a new weapon may be added through the voice instruction. For example, a firing point of a machine gun may be set by inputting "machine guns" through voice.

It can be seen that, in the embodiment, before the AR game is controlled according to the game control instruction, the target object may be first determined according to the voice instruction, where the target object has been displayed in the combat interface before the voice instruction is input. Referring to FIG. 7, a game character and a rifle have already been displayed in the current AR game interface, in this case, the rifle may be selected as the target object to be controlled when the user inputs "bang bang bang" through voice. In addition, in the embodiment, the controlled target object may also not be displayed in the current AR game interface. As shown in FIG. 8, before the AR game is controlled according to the game control instruction, the target object may be first determined according to the voice instruction, and then the target object may be generated and displayed in the battle interface, to trigger the control. That is, when the user inputs "boom boom boom" through voice, the grenade may be first generated in the combat interface, and then the grenade may be triggered to explode for attack.

Furthermore, for the case where the target object needs to be generated and displayed in the combat interface, position information of the target object may be determined according to the voice instruction, and then the target object may be generated and displayed at a position corresponding to the position information in the combat interface. For example, when the user's voice input is "boom boom boom at lower left", the grenade may be generated in the lower left area of the combat interface and the generated grenade may be exploded for attack.

An interface trigger control corresponding to the controlled target object may be located in a secondary interface of the current interface, where the secondary interface is an interface that is invoked and displayed after a specific control is triggered in the current interface. It can be understood that, in the related art, if the interface trigger control corresponding to the controlled target object is not in the current interface, the target object cannot be directly triggered; rather, the user usually needs to trigger a relevant interface jump control in the current interface to enter another interface linked with the current interface (i.e., the secondary interface of the current interface), and then continue to trigger a required interface trigger control in the secondary interface. For this case, by controlling the interface trigger control located in the secondary interface through the voice instruction, the user does not need to perform the complicated interface trigger operations, which may greatly improve the trigger efficiency. It is still illustrated by taking the shooting game as an example. For example, when a target object is equipped with multiple weapons, in the related art, the user usually cannot directly switch the current weapon to a required target weapon; rather, the user needs to enter an arsenal interface first, and then select the required weapon. For this case, the operation efficiency can be greatly improved by perform the controlling through the voice instruction in the embodiment.

Figure 9:
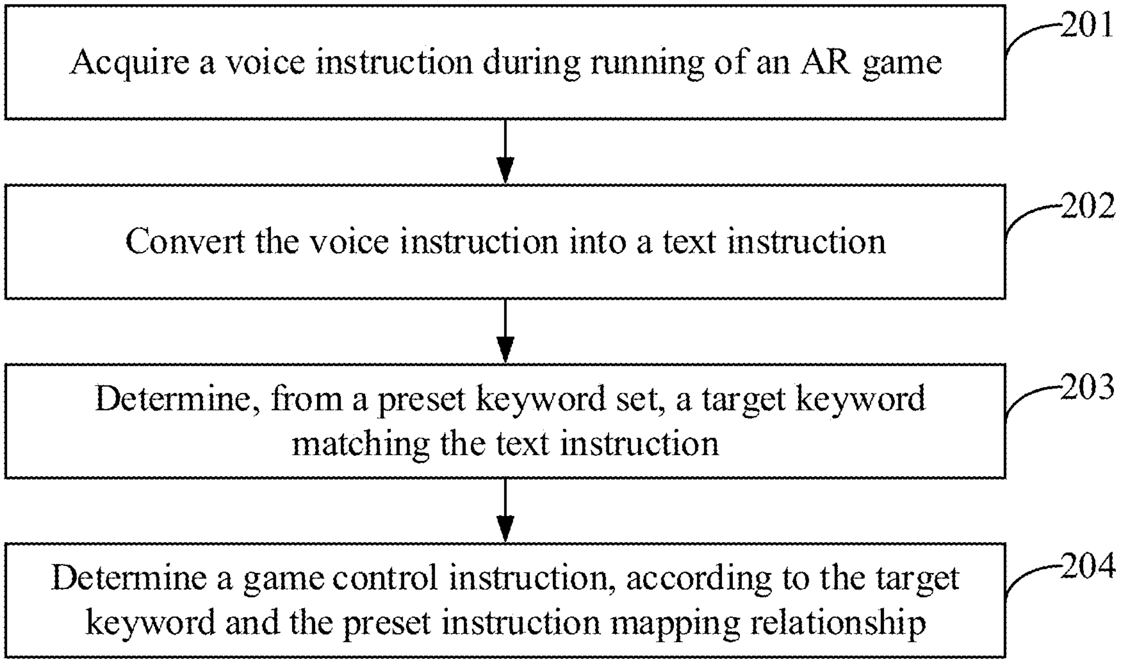
FIG. 9 is a schematic flowchart of a method for controlling an AR game according to another exemplary embodiment of the present disclosure.

FIG. 9 is a schematic flowchart of a method for controlling an AR game according to another exemplary embodiment of the present disclosure. As shown in FIG. 9, the method for controlling an AR game provided in the embodiment includes operations as follow.

At step 201, a voice instruction is acquired during running of an AR game.

When a user plays an AR game, real objects and scenes, such as a real desktop, may be captured through a camera on a terminal device. Then, game elements are fused on an image of the real desktop through a processor in the terminal device, and an AR game interface is displayed on a display screen of the terminal device. During the running of the AR game, the user may input corresponding voice instructions according to the control requirements for the game.

At step 202, the voice instruction is converted into a text instruction.

After the voice instruction is acquired, voice input may be converted into text input through a voice recognition function module, and then a game control instruction may be determined according to the text obtained through voice recognition and a preset instruction mapping relationship. Specifically, the voice recognition module may be queried, at intervals, whether it recognizes a text instruction corresponding to the user's voice instruction. After it is monitored that the voice recognition module has recognized the text instruction, a registered monitor may be informed to make comparison for the instruction, where the registered monitor is a program module that compares the voice recognition result obtained in the voice recognition function module with preset instructions.

In addition, on the basis of converting the voice instruction into the text instruction, a voice characteristic may also be determined according to the voice instruction, where the voice characteristic may be used to distinguish users from each other (for example, the user's identity characteristic). For example, the user's identity characteristic may be determined according to a voiceprint characteristic of a target audio in the voice instruction, and then according to the determined user's identity characteristic, a game character corresponding to the identity characteristic may be controlled. For example, when the AR game is a multiplayer game, multiple game characters are usually needed in the game interface, and each game character corresponds to a control user. In this embodiment, the voice characteristic may be first determined according to the voice instruction, and then the target game character may be determined according to the voice characteristic, to control the target game character according to the game control instruction.

It is illustrated by taking the AR shooting game as an example, where this type of game may enable multiple persons to control multiple different game characters on a same terminal device. For example, user A controls character A and user B controls character B. In this case, after user A and/or user B issues a voice instruction, voiceprint recognition may be first performed on the voice instruction, and then a virtual object to be controlled may be determined according to the recognized voiceprint characteristic, so as to control a corresponding game character or attack weapon to attack. Alternatively, multiple persons may control multiple different game characters on different terminal devices. In this case, the distances between multiple users are usually close, and the voice instructions issued by the individual users are easy to interfere with each other. For example, user A controls terminal A and user B controls terminal B, but the voice instruction issued by user A is easily executed by terminal B by mistake due to a close distance therebetween. Therefore, after user A and/or user B issues a voice instruction, it is necessary to first perform voiceprint recognition on the voice instruction, and then control the game character or attack weapon in the corresponding terminal to attack.

At step 203, a target keyword matching the text instruction is determined from a preset keyword set.

Specifically, the text instruction may be first determined according to the voice instruction, then the target keyword matching the text instruction is determined from the preset keyword set, and finally a game control instruction is determined according to the preset instruction mapping relationship and the target keyword.

At step 204, a game control instruction is determined according to the preset instruction mapping relationship and the game control instruction.

The preset keyword set may be defined in advance. When a valid keyword is obtained from the input, though the established mapping relationship between keywords and game control instructions, the AR game can be quickly controlled by inputting the voice instruction.

As shown in FIG. 3, for the problem that mobile phone is easy to slide down in the AR shooting game, it may be solved by changing the posture of holding the mobile phone. In the way of controlling the game based on triggering through the voice instruction, the user does not need to trigger the touch screen with the thumb, and thus the thumb may be used as a supporting point. Specifically, the new posture may use the thumb, instead of the palm, as the supporting point, so as to better fix the mobile phone.

During the running of the AR game, video information may be acquired through a front camera of the device, and then a current holding mode may be determined according to the video information. If the holding mode is inconsistent with a target holding mode, a prompt message is displayed, where the prompt message is used to instruct the holding mode of the device to be adjusted. It is worth noting that, when the mobile phone is held in the holding mode as shown in FIG. 2, the front camera would be blocked by the hand when the user operates. Therefore, it may be determined whether the current holding mode is consistent with the target holding mode by acquiring the video information with the device's camera, such as the front camera. If the current holding mode is inconsistent with the target holding mode, the prompt information may be output, for example, a video showing the correct holding mode, to prompt the user to use the thumb, instead of the palm, as the supporting point. Accordingly, the user can better operate the mobile phone during the game, which improves the user's game experience. Furthermore, it can effectively prevent the mobile phone from being damaged due to falling during the AR game.

Figure 10:
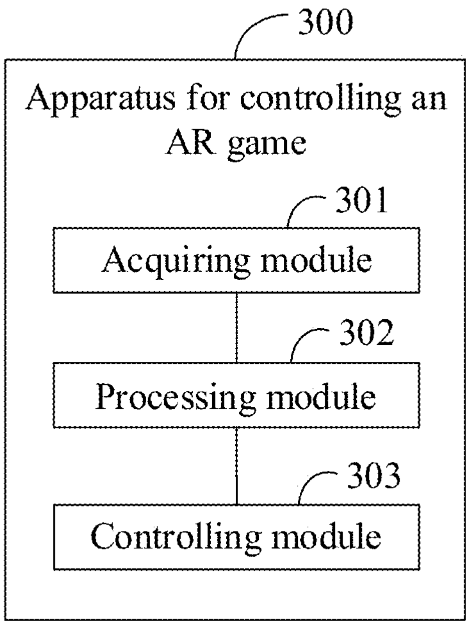
FIG. 10 is a schematic structural diagram of an apparatus for controlling an AR game according to an exemplary embodiment of the present disclosure.

FIG. 10 is a schematic structural diagram of an apparatus for controlling an AR game according to an exemplary embodiment of the present disclosure. As shown in FIG. 10, the apparatus 300 for controlling an AR game provided by the embodiment includes:

- an acquiring module 301, configured to acquire a voice instruction during running of an AR game;
- a processing module 302, configured to determine a game control instruction, according to the voice instruction and a preset instruction mapping relationship; and
- a controlling module 303, configured to control a virtual object in the AR game according to the game control instruction, where the virtual object is a game element that is superimposed and displayed on an image of a real environment.

According to one or more embodiments of the present disclosure, the acquiring module 301 is specifically configured to:

- acquire the voice instruction in a combat interface of the AR game, where the voice instruction is used to instruct a target object in the AR game to execute a target action, and the virtual object includes the target object.

According to one or more embodiments of the present disclosure, the processing module 302 is further configured to determine the target object according to the voice instruction, where the target object has been displayed in the combat interface before the voice instruction is input.

According to one or more embodiments of the present disclosure, the processing module 302 is further configured to: determine the target object according to the voice instruction, and generate and display the target object in the combat interface.

According to one or more embodiments of the present disclosure, the processing module 302 is further configured to: determine position information of the target object according to the voice instruction; and generate and display the target object at a position corresponding to the position information in the combat interface.

According to one or more embodiments of the present disclosure, an interface trigger control corresponding to the target object is located in a secondary interface of the combat interface, and the secondary interface is an interface that is invoked after a specific control is triggered in the combat interface.

According to one or more embodiments of the present disclosure, the target object includes a game prop, and the controlling module 303 is specifically configured to:

- determine a frequency of voice input according to the voice instruction, where the frequency of voice input is used to represent an input speed of a target audio in the voice instruction; and
- determine, according to the frequency of voice input, a frequency at which the game prop executes the target action.

According to one or more embodiments of the present disclosure, the target audio includes an onomatopoeic word corresponding to execution of the target action by the game prop.

According to one or more embodiments of the present disclosure, the target object includes a game prop, and the controlling module 303 is specifically configured to:

determine a volume of voice input according to the voice instruction, where the volume of voice input is used to represent a sound intensity of the target audio in the voice instruction; and determine, according to the volume of voice input, an area of effect and/or intensity of the target action executed by the game prop.

According to one or more embodiments of the present disclosure, the controlling module 303 is specifically configured to:

convert the voice instruction into a text instruction;

determine, from a preset keyword set, a target keyword matching the text instruction; and determine the game control instruction, according to the target keyword and the preset instruction mapping relationship.

According to one or more embodiments of the present disclosure, the processing module 302 is specifically configured to:

acquire video information through a camera apparatus of a device during the running of the AR game;

determine a current holding mode of the device, according to the video information; and display prompt information if the current holding mode is inconsistent with a target holding mode, where the prompt information is used to instruct the current holding mode of the device to be adjusted.

According to one or more embodiments of the present disclosure, the controlling module 303 is specifically configured to:

determine a voice characteristic according to the voice instruction, where the voice characteristic is used to represent a voiceprint characteristic of the target audio in the voice instruction; and determine, according to the voice characteristic, a target game character controlled by the voice instruction, so as to control the target game character according to the game control instruction.

It is worth noting that the apparatus for controlling an AR game provided by the embodiment shown in FIG. 10 may be used to execute the method provided by any of the above embodiments, and it has similar specific implementations and technical effects, which will not be repeated here.

Figure 11:
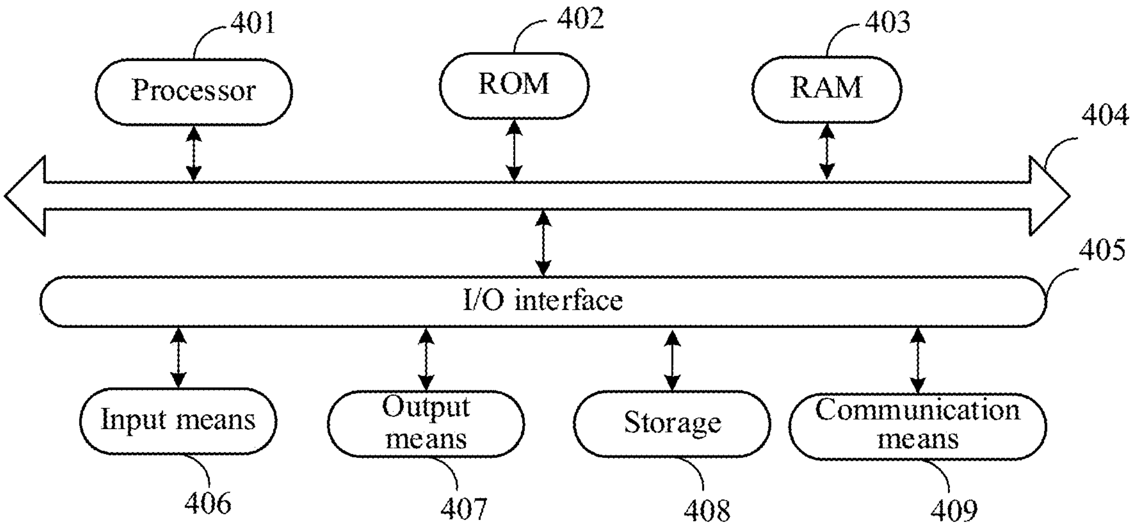
FIG. 11 is a schematic structural diagram of an electronic device according to an exemplary embodiment of the present disclosure.

FIG. 11 is a schematic structural diagram of an electronic device according to an exemplary embodiment of the present disclosure. As shown in FIG. 11, a schematic structural diagram of an electronic device 400 suitable for implementing the embodiments of the present disclosure is shown. The electronic device in the disclosed embodiments may include, but is not limited to: a mobile terminal with an image acquisition function, such as a mobile phone, a notebook computer, a digital broadcast receiver, a personal digital assistant (PDA), a portable android device (PAD), a portable multimedia player (PMP), an vehicle-mounted terminal (e.g., vehicle-mounted navigation terminal); and a fixed terminal with an image acquisition device, such as a digital TV and a desktop computer. The electronic device shown in FIG. 11 is merely an example, which should not impose any limitation to the functions and application scopes of the embodiments of the present disclosure.

As shown in FIG. 11, the electronic device 400 may include a processor (such as a central processing unit, or a graphics processor) 401, which may perform various appropriate actions and processes according to a program stored in a read only memory (ROM) 402 or a program loaded from a storage means 408 into a random access memory (RAM) 403. In the RAM 403, various programs and data required for the operations of the electronic device 400 are also stored. The processor 401, ROM 402, and RAM 403 are connected to each other through a bus 404. An input/output (I/O) interface 405 is also connected to bus 404. The memory is used to store programs for implementing the methods described in the above-mentioned various method embodiments, and the processor is configured to execute programs stored in the memory.

Generally, the following means may be connected to the I/O interface 405: an input means 406 including, for example, a touch screen, a touch panel, a keyboard, a mouse, a camera, a microphone, an accelerometer, a gyroscope, and the like; an output means 407 including a liquid crystal display (LCD), a speaker, a vibrator and the like; the storage means 408 including a magnetic tape, a hard disk and the like; and a communication means 409. The communication means 409 may allow the electronic device 400 to perform wireless or wired communication with other devices for data exchange. Although the electronic device 400 shown in FIG. 11 has various means, it should be understood that it is not necessary to implement or have all the means shown. Alternatively, more or fewer means may be implemented or provided.

Particularly, according to the embodiments of the present disclosure, the process described above with reference to the flowchart may be implemented as a computer software program. For example, the embodiments of the present disclosure include a computer program product, which includes a computer program carried on a non-transitory computer readable medium, and the computer program contains program code for implementing the method shown in the flowchart of the embodiments of the present disclosure. In such an embodiment, the computer program may be downloaded and installed from the network through the communication means 409, or installed from the storage means 408 or the ROM 402. When the computer program is executed by the processor 401, the above functions defined in the method of the embodiments of the present disclosure is implemented.

It should be noted that the above-mentioned computer-readable medium of the present disclosure may be a computer-readable signal medium or a computer-readable storage medium or any combination of the above two. The computer-readable storage medium may be, for example, but not limited to, an electronic, magnetic, optical, electromagnetic, infrared, or semiconductor system, apparatus or device, or a combination of any of the above. More specific examples of the computer-readable storage medium may include, but are not limited to, an electrical connection with one or more wires, a portable computer diskette, a hard disk, a random access memory (RAM), a read only memory (ROM), an erasable programmable read only memory (EPROM), a flash memory, an optical fiber, a portable compact disk read only memory (CD-ROM), an optical storage device, a magnetic storage device, or any suitable combinations of the above. In the present disclosure, the computer-readable storage medium may be any tangible medium that contains or stores a program, where the program may be used by or in connection with an instruction execution system, apparatus or device. And in this disclosure, the computer-readable signal medium may include a data signal propagated in a baseband or as part of a carrier wave, in which computer-readable program codes are carried. This propagated data signal may be in various forms, including but not limited to an electromagnetic signal, an optical signal or any suitable combination of the above. The computer-readable signal medium may also be any computer-readable medium other than the computer-readable storage medium, and the computer-readable signal medium may send, propagate or transport a program for use by or in connection with the instruction execution system, apparatus or device. The program codes contained on the computer readable medium may be transmitted by any suitable medium, including but not limited to an electric wire, an optical cable, a radio frequency (RF) and the like, or any suitable combination of the above.

The computer readable medium may be included in the electronic device, or it may exist separately without being assembled into the electronic device.

The computer-readable medium carries one or more programs, and the one or more programs, when being executed by the electronic device, cause the electronic device to: acquire a voice instruction during running of an AR game; determine a game control instruction, according to the voice instruction and a preset instruction mapping relationship; and control a virtual object in the AR game according to the game control instruction.

Computer program codes for implementing the operations of the present disclosure may be written in one or more programming languages or their combinations, where the programming languages include but are not limited to: object-oriented programming languages, such as Java, Smalltalk, and C++; and conventional procedural programming languages, such as "C" language or similar programming languages. The program codes may be executed completely on the user's computer, partially on the user's computer, as an independent software package, partially on the user's computer and partially on a remote computer, or completely on a remote computer or a server. In the case where a remote computer is involved, the remote computer may be connected to the user computer through any kind of network, including a local area network (LAN) or a wide area network (WAN), or it may be connected to an external computer (for example, using an internet service provider to connect through the internet).

In some embodiments, the client and the server may communicate by using any currently known or future developed network protocol such as hypertext transfer protocol (HTTP), and may be interconnected with any form or medium of digital data communication (e.g., communication network). Examples of the communication networks include local area network ("LAN"), wide area network ("WAN"), Internet network (e.g., the Internet) and peer-to-peer network (e.g., peer-to-peer ad hoc network), as well as any currently known or future developed networks.

The flowchart and block diagram in the drawings illustrate the architecture, functions and operations of possible implementations of systems, methods and computer program products according to various embodiments of the present disclosure. In this regard, each block in the flowchart or block diagram may represent a module, program segment, or part of codes, where the module, program segment, or part of codes contains one or more executable instructions for implementing the specified logical functions. It should also be noted that, in some alternative implementations, the functions marked in the blocks may also occur in a different order from those marked in the drawings. For example, two consecutive blocks may actually be executed substantially in parallel, and sometimes they may be executed in a reverse order, depending on the functions involved. It should also be noted that each block in the block diagram and/or flowchart, and the combination of blocks in the block diagram and/or flowchart, may be implemented by a dedicated hardware-based system that performs specified functions or operations, or may be implemented by a combination of dedicated hardware and computer instructions.

The modules involved in the embodiments described in the present disclosure may be implemented in software or hardware. In some cases, the name of the module does not limit the unit itself. For example, a display module may also be described as "a unit that displays a target face and a face mask sequence".

The functions described above in the context may be at least partially performed by one or more hardware logic components. For example, without limitation, exemplary types of hardware logic components that may be used include: field programmable gate arrays (FPGA), application specific integrated circuits (ASIC), application specific standard products (ASSP), system on chips (SOC), complex programmable logic devices (CPLD), etc.

In the context of the present disclosure, a machine-readable medium may be a tangible medium that may contain or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any suitable combination of the above.

The embodiments of the present disclosure also provide a computer program which, when being executed by a processor, causes the method for controlling an AR game provided by any of the above embodiments to be implemented.

In a first aspect, according to one or more embodiments of the present disclosure, a method for controlling an AR game is provided, and the method includes:

acquiring a voice instruction during running of the AR game;

determining a game control instruction, according to the voice instruction and a preset instruction mapping relationship; and controlling a virtual object in the AR game according to the game control instruction, where the virtual object is a game element that is superimposed and displayed on an image of a real environment.

According to one or more embodiments of the present disclosure, the acquiring a voice instruction during running of the AR game includes:

acquiring the voice instruction, where the voice instruction is used to instruct a target object in the AR game to execute a target action, and the virtual object includes the target object.

According to one or more embodiments of the present disclosure, before controlling the AR game according to the game control instruction, it further includes:

- determining the target object according to the voice instruction, where the target object has been displayed in an interface of the AR game before the voice instruction is input.

According to one or more embodiments of the present disclosure, before controlling the AR game according to the game control instruction, it further includes:

- determining the target object according to the voice instruction; and
- generating and displaying the target object in an interface of the AR game.

According to one or more embodiments of the present disclosure, the generating and displaying the target object in the interface includes:

- determining position information of the target object according to the voice instruction; and
- generating and displaying the target object at a position corresponding to the position information in the interface.

According to one or more embodiments of the present disclosure, an interface trigger control corresponding to the target object is located in a secondary interface of the interface, and the secondary interface is an interface that is invoked and displayed after a specific control is triggered in the interface.

According to one or more embodiments of the present disclosure, the target object includes a game prop in the interface, and the controlling the virtual object in the AR game according to the game control instruction includes:

- determining a frequency of voice input according to the voice instruction, where the frequency of voice input is used to represent an input speed of a target audio in the voice instruction; and
- determining, according to the frequency of voice input, a frequency at which the game prop executes the target action.

According to one or more embodiments of the present disclosure, the target audio includes an onomatopoeic word corresponding to execution of the target action by the game prop.

According to one or more embodiments of the present disclosure, the target object includes a game prop in the interface, and the controlling the virtual object in the AR game according to the game control instruction includes:

- determining a volume of voice input according to the voice instruction, where the volume of voice input is used to represent a sound intensity of a target audio in the voice instruction; and
- determining, according to the volume of voice input, an area of effect and/or intensity of the target action executed by the game prop.

According to one or more embodiments of the present disclosure, the determining a game control instruction according to the voice instruction and a preset instruction mapping relationship includes:

- converting the voice instruction into a text instruction;
- determining, from a preset keyword set, a target keyword matching the text instruction; and
- determining the game control instruction, according to the target keyword and the preset instruction mapping relationship.

According to one or more embodiments of the present disclosure, the method for controlling an AR game further includes:

- acquiring video information through a camera apparatus of a device during the running of the AR game;
- determining a current holding mode of the device, according to the video information; and
- displaying prompt information if the current holding mode is inconsistent with a target holding mode, where the prompt information is used to instruct the current holding mode of the device to be adjusted.

According to one or more embodiments of the present disclosure, the target object includes a plurality of game characters in the interface, and the controlling a virtual object in the AR game according to the game control instruction includes:

- determining a voice characteristic according to the voice instruction, where the voice characteristic is used to represent a voiceprint characteristic of a target audio in the voice instruction; and
- determining, according to the voice characteristic, a target game character of the plurality of game characters that is to be controlled by the voice instruction, so as to control the target game character according to the game control instruction.

In a second aspect, according to one or more embodiments of the present disclosure, an apparatus for controlling an AR game is provided, and the apparatus includes:

- an acquiring module, configured to acquire a voice instruction during running of the AR game;
- a processing module, configured to determine a game control instruction, according to the voice instruction and a preset instruction mapping relationship; and
- a controlling module, configured to control a virtual object in the AR game according to the game control instruction, where the virtual object is a game element that is superimposed and displayed on an image of a real environment.

According to one or more embodiments of the present disclosure, the acquiring module is specifically configured to:

- acquire the voice instruction in a combat interface of the AR game, where the voice instruction is used to instruct a target object in the AR game to execute a target action, and the virtual object includes the target object.

According to one or more embodiments of the present disclosure, the processing module is further configured to determine the target object according to the voice instruction, where the target object has been displayed in the combat interface before the voice instruction is input.

According to one or more embodiments of the present disclosure, the processing module is further configured to: determine the target object according to the voice instruction, and generate and display the target object in the combat interface.

According to one or more embodiments of the present disclosure, the processing module is further configured to: determine position information of the target object according to the voice instruction; and generate and display the target object at a position corresponding to the position information in the combat interface.

According to one or more embodiments of the present disclosure, an interface trigger control corresponding to the target object is located in a secondary interface of the combat interface, where the secondary interface is an interface that is invoked after a specific control is triggered in the combat interface.

According to one or more embodiments of the present disclosure, the target object includes a game prop, and the controlling module is specifically configured to:

determine a frequency of voice input according to the voice instruction, where the frequency of voice input is used to represent an input speed of a target audio in the voice instruction; and determine, according to the frequency of voice input, a frequency at which the game prop executes the target action.

According to one or more embodiments of the present disclosure, the target audio includes an onomatopoeic word corresponding to execution of the target action by the game prop.

According to one or more embodiments of the present disclosure, the target object includes a game prop, and the controlling module is specifically configured to:

determine a volume of voice input according to the voice instruction, where the volume of voice input is used to represent a sound intensity of the target audio in the voice instruction; and determine, according to the volume of voice input, an area of effect and/or intensity of the target action executed by the game prop.

According to one or more embodiments of the present disclosure, the controlling module is specifically configured to:

convert the voice instruction into a text instruction;

determine, from a preset keyword set, a target keyword matching the text instruction; and determine the game control instruction, according to the target keyword and the preset instruction mapping relationship.

According to one or more embodiments of the present disclosure, the processing module is further configured to:

acquire video information through a camera apparatus of a device during the running of the AR game;

determine a current holding mode of the device, according to the video information; and display prompt information if the current holding mode is inconsistent with a target holding mode, where the prompt information is used to instruct the current holding mode of the device to be adjusted.

According to one or more embodiments of the present disclosure, the controlling module is specifically configured to:

determine a voice characteristic according to the voice instruction, where the voice characteristic is used to represent a voiceprint characteristic of a target audio in the voice instruction; and determine, according to the voice characteristic, a target game character controlled by the voice instruction, so as to control the target game character according to the game control instruction.

In a third aspect, the embodiments of the present disclosure provide an electronic device, including:

a processor;

a memory, configured to store a computer program for the processor; and a display, configured to display an AR game interface processed by the processor;

where the processor is configured to implement, by executing the computer program, the method for controlling an AR game as described in the first aspect and various possible designs of the first aspect.

In a fourth aspect, the embodiments of the present disclosure provide a computer-readable storage medium storing computer-executable instructions thereon. When a processor executes the computer-executable instructions, the method for controlling an AR game described in the first aspect and various possible designs of the first aspect above is implemented.

In a fifth aspect, the embodiments of the present disclosure provide a computer program product, including a computer program carried on a computer-readable medium. When the computer program is executed by a processor, the method for controlling an AR game described in the first aspect and various possible designs of the first aspect above is implemented.

In a sixth aspect, the embodiments of the present disclosure provide computer program which, when being executed by a processor, causes the method for controlling an AR game described in the first aspect and various possible designs of the first aspect above to be implemented.

The above description merely illustrates preferred embodiments of the present disclosure and the technical principles applied. It should be understood by those skilled in the art that the scope involved in the present disclosure is not limited to the technical solutions formed by specific combinations of the above technical features, but should also cover other technical solutions formed by any combination of the above technical features or their equivalent features without departing from the above disclosed concept, for example, a technical solution formed by replacing the above features with (but not limited to) technical features with similar functions disclosed in the present disclosure.

In addition, although the operations are depicted in a specific order, this should not be understood that these operations are required to be performed in the specific order shown or in a sequential order. Under certain circumstances, multitasking and parallel processing may be beneficial. Similarly, although several specific implementation details are included in the above discussion, these should not be interpreted as limiting the scope of the present disclosure. Some features described in the context of separate embodiments may also be implemented in a single embodiment in combination. On the contrary, various features described in the context of a single embodiment may also be implemented in multiple embodiments alone or in any suitable sub-combination.

Although the subject matter has been described in language specific to structural features and/or logical acts of methods, it should be understood that the subject matter defined in the appended claims is not necessarily limited to the specific features or acts described above. On the contrary, the specific features and actions described above are only example forms for realizing the claims.

What is claimed is:

1. A method for controlling an augmented reality (AR) game, comprising:

acquiring a voice instruction during running of the AR game;

determining a game control instruction, according to the voice instruction and a preset instruction mapping relationship;

controlling a virtual object in the AR game according to the game control instruction, wherein the virtual object is a game element that is superimposed and displayed on an image of a real environment; and displaying prompt information if a current holding mode is inconsistent with a target holding mode, wherein the prompt information is used to instruct the current holding mode of a device to be adjusted.

2. A method for controlling an augmented reality (AR) game, comprising:

acquiring a voice instruction during running of the AR game;

determining a game control instruction, according to the voice instruction and a preset instruction mapping relationship;

controlling a virtual object in the AR game according to the game control instruction, wherein the virtual object is a game element that is superimposed and displayed on an image of a real environment;

acquiring video information through a camera apparatus of a device, during the running of the AR game;

determining a current holding mode of the device, according to the video information; and displaying prompt information if the current holding mode is inconsistent with a target holding mode, wherein the prompt information is used to instruct the current holding mode of the device to be adjusted.

3. The method for controlling an AR game according to claim 2, wherein the acquiring a voice instruction comprises:

acquiring the voice instruction, wherein the voice instruction is used to instruct a target object in the AR game to execute a target action, and the virtual object comprises the target object.

4. The method for controlling an AR game according to claim 3, wherein before controlling the virtual object in the AR game according to the game control instruction, the method further comprises:

determining the target object according to the voice instruction, wherein the target object has been displayed in an interface of the AR game before the voice instruction is input.

5. The method for controlling an AR game according to claim 3, wherein before controlling the virtual object in the AR game according to the game control instruction, the method further comprises:

determining the target object according to the voice instruction; and generating and displaying the target object in an interface of the AR game.

6. The method for controlling an AR game according to claim 5, wherein the generating and displaying the target object in an interface of the AR game comprises:

determining position information of the target object according to the voice instruction; and generating and displaying the target object at a position corresponding to the position information in the interface.

7. The method for controlling an AR game according to claim 6, wherein an interface trigger control corresponding to the target object is located in a secondary interface of the interface, and the secondary interface is an interface that is invoked and displayed after a specific control is triggered in the interface.

8. The method for controlling an AR game according to claim 3, wherein the target object comprises a game prop in an interface of the AR game, and the controlling a virtual object in the AR game according to the game control instruction comprises:

determining a frequency of voice input according to the voice instruction, wherein the frequency of voice input is used to represent an input speed of a target audio in the voice instruction; and determining, according to the frequency of voice input, a frequency at which the game prop executes the target action.

9. The method for controlling an AR game according to claim 8, wherein the target audio comprises an onomatopoeic word corresponding to execution of the target action by the game prop.

10. The method for controlling an AR game according to claim 3, wherein the target object comprises a game prop in an interface of the AR game, and the controlling a virtual object in the AR game according to the game control instruction comprises:

determining a volume of voice input according to the voice instruction, wherein the volume of voice input is used to represent a sound intensity of a target audio in the voice instruction; and determining, according to the volume of voice input, at least one of an area of effect and intensity of the target action executed by the game prop.

11. The method for controlling an AR game according to claim 2, wherein the determining a game control instruction according to the voice instruction and a preset instruction mapping relationship comprises:

converting the voice instruction into a text instruction;

determining, from a preset keyword set, a target keyword matching the text instruction; and determining the game control instruction, according to the target keyword and the preset instruction mapping relationship.

12. The method for controlling an AR game according to claim 3, wherein the target object comprises a plurality of game characters in an interface of the AR game, and the controlling a virtual object in the AR game according to the game control instruction comprises:

determining a voice characteristic according to the voice instruction; and determining, according to the voice characteristic, a target game character of the plurality of game characters that is to be controlled by the voice instruction, so as to control the target game character according to the game control instruction.

13. A non-transitory computer-readable storage medium storing computer-executable instructions thereon, wherein when a processor executes the computer-executable instructions, the method for controlling an augmented reality (AR) game according to claim 2 is implemented.

14. An electronic device, comprising:

a processor, a memory, configured to store a computer program; and a display, configured to display an augmented reality (AR) game interface processed by the processor;

wherein the computer program, when being executed by the processor, causes the processor to:

acquire a voice instruction during running of an AR game;

determine a game control instruction, according to the voice instruction and a preset instruction mapping relationship;

control a virtual object in the AR game according to the game control instruction, wherein the virtual object is a game element that is superimposed and displayed on an image of a real environment;

acquire video information through a camera apparatus of a device, during the running of the AR game;

determine a current holding mode of the device, according to the video information; and display prompt information if the current holding mode is inconsistent with a target holding mode, wherein the prompt information is used to instruct the current holding mode of the device to be adjusted.

15. The electronic device according to claim 14, wherein the voice instruction is used to instruct a target object in the AR game to execute a target action, and the virtual object comprises the target object.

16. The electronic device according to claim 15, wherein before the virtual object in the AR game is controlled according to the game control instruction, the computer program, when being executed by the processor, further causes the processor to:

determine the target object according to the voice instruction, wherein the target object has been displayed in the AR game interface before the voice instruction is input.

17. The electronic device according to claim 15, wherein before the virtual object in the AR game is controlled according to the game control instruction, the computer program, when being executed by the processor, further causes the processor to:

determine the target object according to the voice instruction;

determine position information of the target object according to the voice instruction; and generate and display the target object at a position corresponding to the position information in the AR game interface.

18. The electronic device according to claim 17, wherein an interface trigger control corresponding to the target object is located in a secondary interface of the AR game interface, and the secondary interface is an interface that is invoked and displayed after a specific control is triggered in the AR game interface.

19. The electronic device according to claim 15, wherein the target object comprises a game prop in the AR game interface, and the computer program, when being executed by the processor, further causes the processor to:

determine a frequency of voice input according to the voice instruction, wherein the frequency of voice input is used to represent an input speed of a target audio in the voice instruction; and determine, according to the frequency of voice input, a frequency at which the game prop executes the target action.

20. The electronic device according to claim 19, wherein the computer program, when being executed by the processor, further causes the processor to:

determine a volume of voice input according to the voice instruction, wherein the volume of voice input is used to represent a sound intensity of the target audio in the voice instruction; and determine, according to the volume of voice input, at least one of an area of effect and intensity of the target action executed by the game prop.

* * * * *